June 10, 1924.
L. WISHNEVSKY
DEMOUNTABLE RIM
Filed Oct. 7, 1920
1,497,052
3 Sheets-Sheet 1
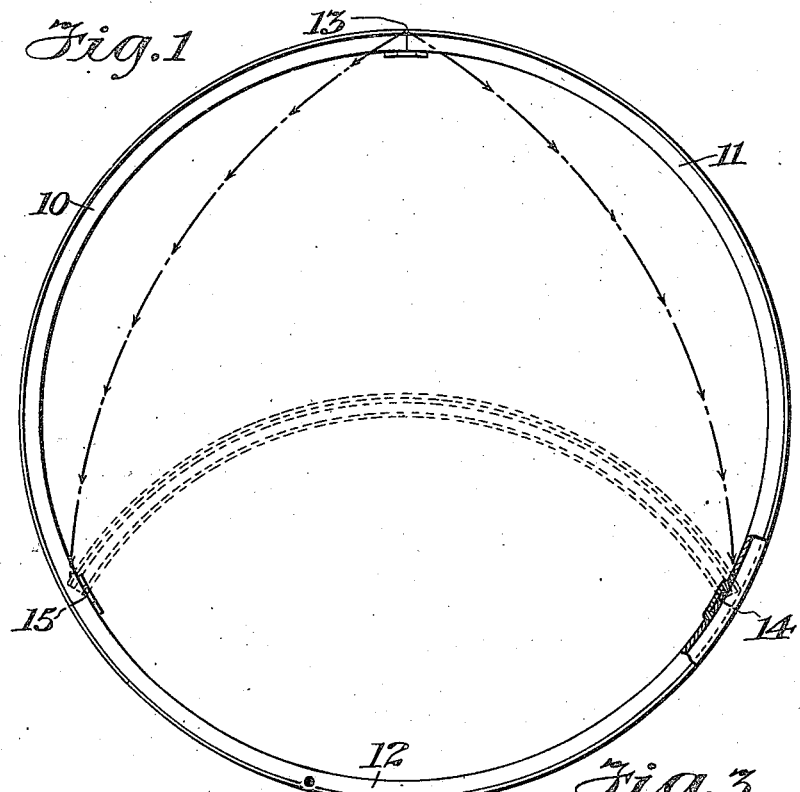
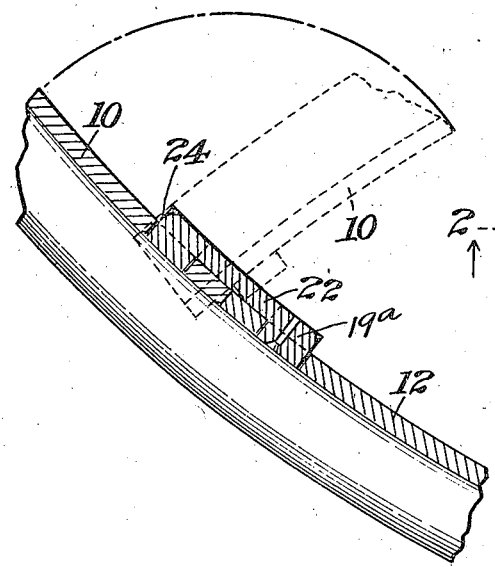
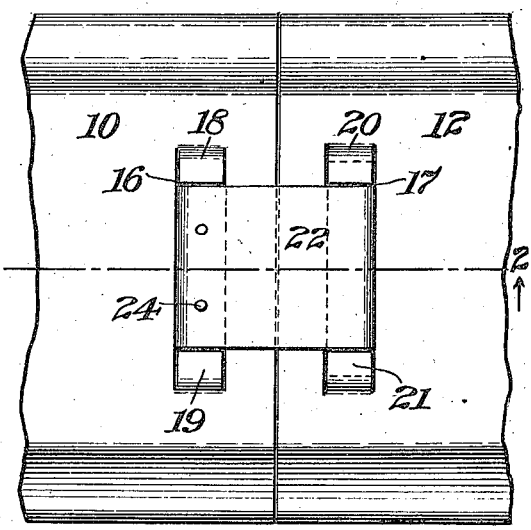
INVENTOR
Leo Wishnevsky
BY
HIS ATTORNEYS June 10, 1924.

L. WISHNEVSKY 1,497,052

DEMOUNTABLE RIM

Filed Oct. 7, 1920

INVENTOR
Leo Wishnevsky
BY
HIS ATTORNEYS

June 10, 1924.

L. WISHNEVSKY

DEMOUNTABLE RIM

Filed Oct. 7, 1920

INVENTOR
Leo Wishnevsky
BY
HIS ATTORNEYS

Patented June 10, 1924.

1,497,052

UNITED STATES PATENT OFFICE.

LEO WISHNEVSKY, OF BROOKLYN, NEW YORK.

DEMOUNTABLE RIM.

Application filed October 7, 1920. Serial No. 415,279.

*To all whom it may concern:*

Be it known that I, LEO WISHNEVSKY, a citizen of Russia, residing in the borough of Brooklyn, county of Kings, city and State of New York, have invented an Improvement in Demountable Rims, of which the following is a specification.

This invention relates to a rim for a vehicle wheel and more particularly to that type of rims known as demountable rims. Heretofore it has been customary in one type of demountable rim to divide the same transversely and in this type of rim it is necessary to contract the parts in order to remove or replace a shoe. In other types of demountable vehicle wheel rims the same have been divided circumferentially but so far as I am aware this type of rim has given substantially the same amount of work and trouble in removing and replacing shoes as the type in which the rim is divided transversely. I am also aware that heretofore it has been proposed to provide a demountable rim for a vehicle wheel transversely into a plurality of sections and to hinge these sections together. In this form of rim, however, the hinge members have necessarily been provided in the inner side of the rim and made it necessary to especially construct the felly of a wheel to provide for the reception of the rim. Now the present invention relates more particularly to this last named type of demountable rim and the object thereof is the provision of a vehicle wheel rim which is collapsible to such an extent that it may be placed in the shoe of a vehicle wheel and the parts set in position by folding the same to place, the construction being such that it is not necessary to change in any way any felly of a vehicle wheel as now constructed in the use of the demountable rim made in accordance with my invention.

In the drawing:
Fig. 1 is a diagrammatic plan and partial section illustrating a demountable rim made in accordance with my invention.

Fig. 2 is an enlarged section through one joint of the rim taken on line 2—2, Fig. 3.
Fig. 3 is a partial plan of the rim at one of the joints showing the inner side of the rim.

Figure 4:
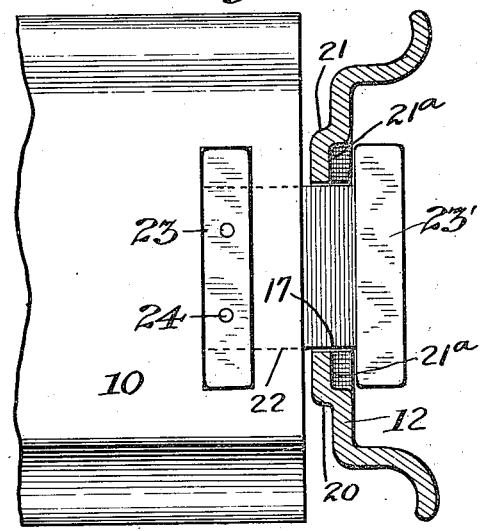
Fig. 4 is a plan and partial section looking at the outer side of the rim and showing one section turned from its position or alignment.

Referring to the drawing and particularly to Figs. 1 to 4 inclusive, it will be seen that in carrying out the invention I prefer to provide my improved demountable rim in three sections, indicated respectively at 10, 11 and 12. The invention relates more particularly to the form of the joint by which these several sections are connected, the joints being indicated at 13, 14 and 15. Furthermore in carrying out the invention it will be understood that the several sections may be so connected as to be hinged together in order that the parts may fold together as indicated in Fig. 1, or the several sections may be connected so as to be entirely separable and interchangeable in assembling the parts. In the form of the invention shown in Figs. 1 to 4 inclusive the section 10, for example, is connected to the section 12 by a suitable plate secured in one section and upon which the other section is hinged. As illustrated the section 10 adjacent one end thereof is provided with a transverse slot 16. Similarly the adjacent end of the section 12 is provided with a corresponding transverse slot 17. Pressed out of material forming the sections of the rim adjacent the ends of these slots there are provided the ears indicated at 18 and 19 in reference to the slot 16 and the ears 20 and 21 relatively to the ends of the slot 17. The ears 20 and 21 form seats 21ª at the outer face of the section 12 and the ears 18 and 19 form similar seats 19ª at the outer face of the section 10. In this construction the connecting member comprises a plate 22 which may be of metal or any other suitable material and is preferably of substantially the same thickness as the body of the rim. Lying within the slot in the section 10 there is a bar 23. This is connected to the plate 22 by rivets 24 or otherwise and these parts may be made to fit so that there is comparatively little play between them, or the edge of the plate 22 may be rounded so that the section 10 will swing on the plate 22 as a hinge. The opposite end of the plate 22 as illustrated in these figures is turned over on itself and the turned over portion is of such an extent as to correspond with the bar 23. This turned over end of the plate is indicated at 23' and the edge thereof is rounded to such an extent that the section 12 will hinge on the plate as is clearly indicated in Fig. 4 of the drawing. The opposite end of the section 12 may be similarly connected to the section 11 while the sections 10 and 11 may be connected by any suitable lock joint when the parts are in their assembled position. By the opening of this joint between the sections 10 and 11, it will be understood that these sections may be folded to the dotted line position as shown in Fig. 1 in which obviously the same will fit readily into a shoe and when so fitted the parts may be turned to their position for use and locked in place. In this form of the invention the flat plates 22 are the only members which come between the rim and the felly of the wheel and in no way interfere with the use of the rim or make it necessary to provide a special rim in the use of this invention.

Figure 5:
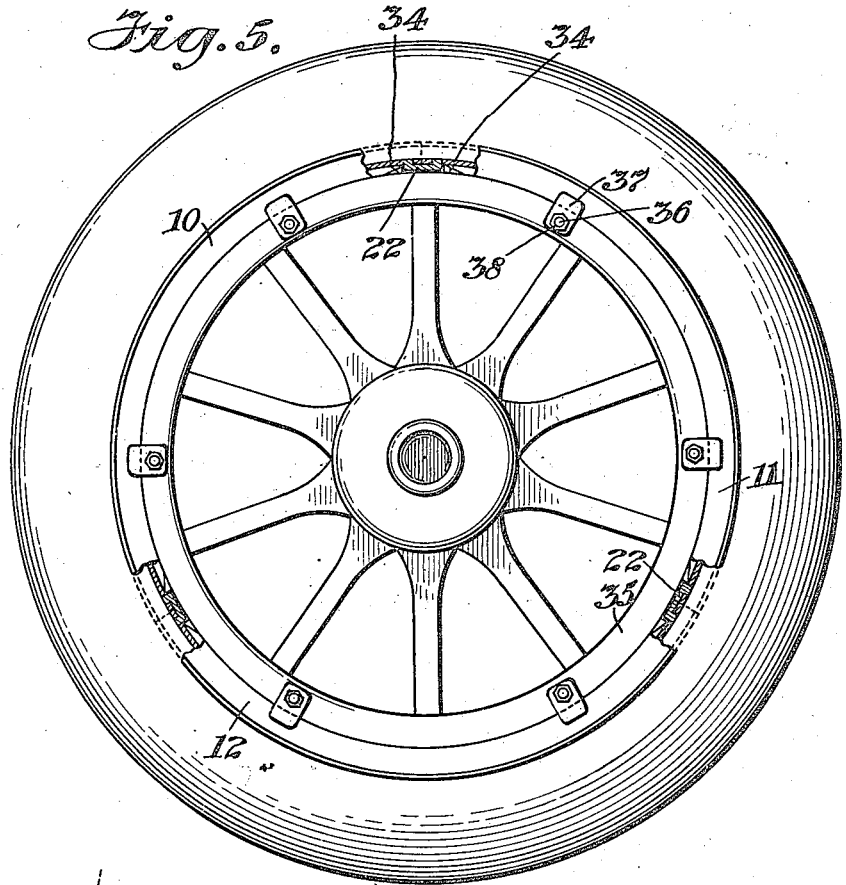
Fig. 5 is an elevation and partial section illustrating one form of the invention as secured in position on the rim of a vehicle wheel, and

In the use of my invention in connection with the wheels of pleasure vehicles of the lighter type, the demountable rim, as hereinbefore described, may be secured in place by the use of clamps as commonly employed in conjunction with the ordinary form of demountable rims. In the use, however, of the invention with extremely large wheels and wheels for heavy trucks it may be advisable to provide the felly band of the wheel with lugs or projections between which the inner plates or parts of the joint connecting the sections of the rim as made in accordance with my invention to prevent the rim from shifting revolubly on the felly band. As shown in Fig. 5 these lugs or projections which are indicated at 34 may be triangular in cross section and employed in pairs corresponding with the number of joints made in the rim of the wheel, these lugs being so spaced as to receive between each pair one of the plates or other parts forming the hinge by which the sections of the rim are connected to one another.

Figure 6:
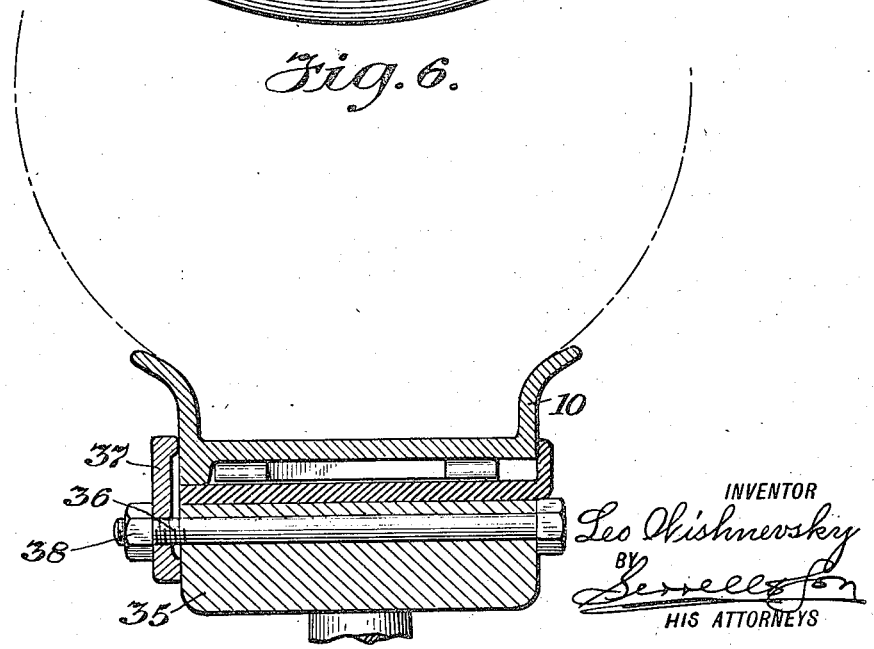
Fig. 6 is a section illustrating the manner in which the rim may be secured in place.

The manner in which the rim made in accordance with this invention may be connected to the felly of a vehicle wheel is shown more or less diagrammatically in section as indicated in Fig. 6 in which the felly of the wheel is shown at 35, the bolt passing through the same by 36 and the clamp engaging the felly of the wheel and the rim by 37, the clamp fitting over the bolt and being secured in position on the same and against the felly and rim by a nut 38 as is customary.

While I have herein shown and described a demountable rim for vehicle wheels divided into three sections, it will be understood that the same construction may be employed and the rim divided into any desired number of sections without departing from the invention, and furthermore that either one of the forms of the invention or equivalent forms may also be employed for accomplishing the same purposes without departing from the invention.

I claim as my invention:

1. A demountable rim for vehicle wheels comprising a plurality of sections each having a transverse slot at one end thereof with offset portions at the ends of each slot forming recesses in the outer face of the rim, a plate extending across the ends of adjacent sections of the rim, and means associated with said plate and adapted to lie in the slot at the end of an adjacent section and to extend into the said recesses at the end of the slot to hingedly and undetachably connect the ends of said adjacent sections to one another.

2. A demountable rim for vehicle wheels comprising a plurality of sections each having a transverse slot adjacent one end thereof with offset portions formed in the body of the rim at the ends of said slots, to provide seats adjacent to the outer face of the rim at the ends of said slots, a plate extending across the ends of adjacent sections of the rim, a bar seated in a pair of said seats in one of said sections and fastened to said section, said plate at its other end adapted to lie in the slot of an adjacent section and to extend into its recesses and bear on its seats to hingedly and undetachably connect the ends of said section to each other.

3. A demountable rim for vehicle wheels comprising a plurality of sections each having a transverse slot adjacent one end thereof with offset portions formed in the body of the rim at the ends of the said slots to provide recesses in the outer face of the rim at the ends of the said slots, a plate fixed to the end of one section next to the slotted end of the adjacent section, and a device connected to the said plate and adapted to lie in the said slot and to extend into the said recesses at the ends thereof to hingedly and undetachably connect the adjacent ends of the said sections.

Signed by me this 29th day of September, 1920.

LEO WISHNEVSKY.